J. H. WRIGHT.
DUSTING MACHINE FOR FRUIT TREES, &c.
APPLICATION FILED MAR. 22, 1916.
1,188,127.
Patented June 20, 1916.
2 SHEETS—SHEET 1.
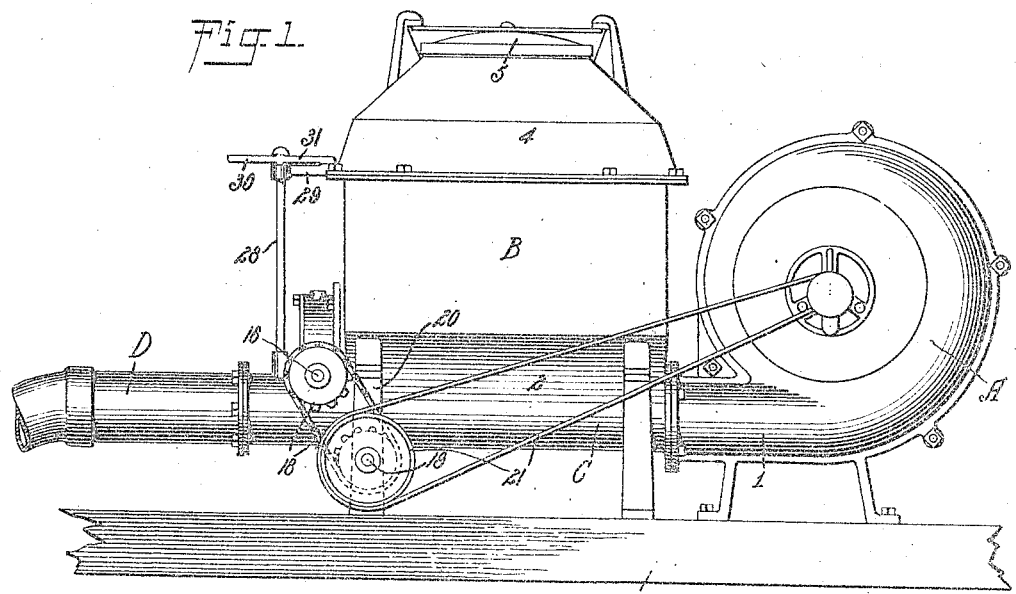
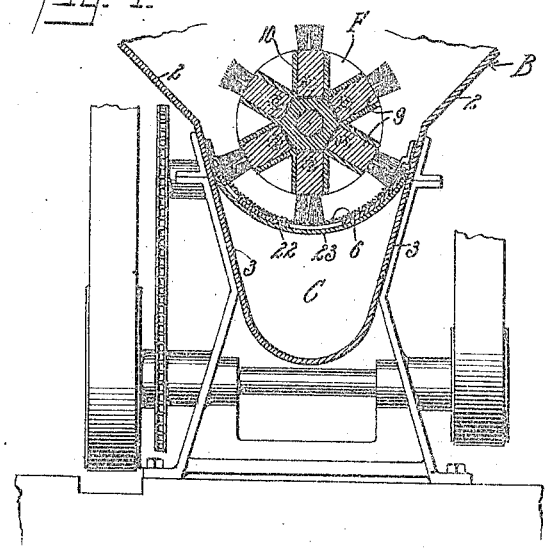
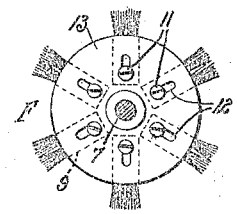
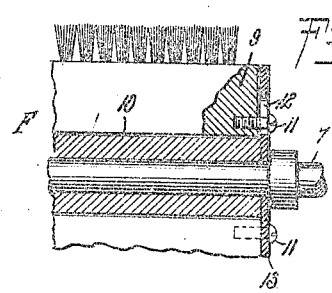
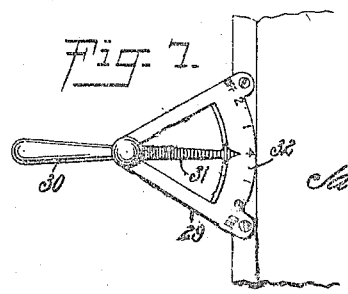
WITNESSES
INVENTOR
Jacob H. Wright
BY
ATTORNEYS

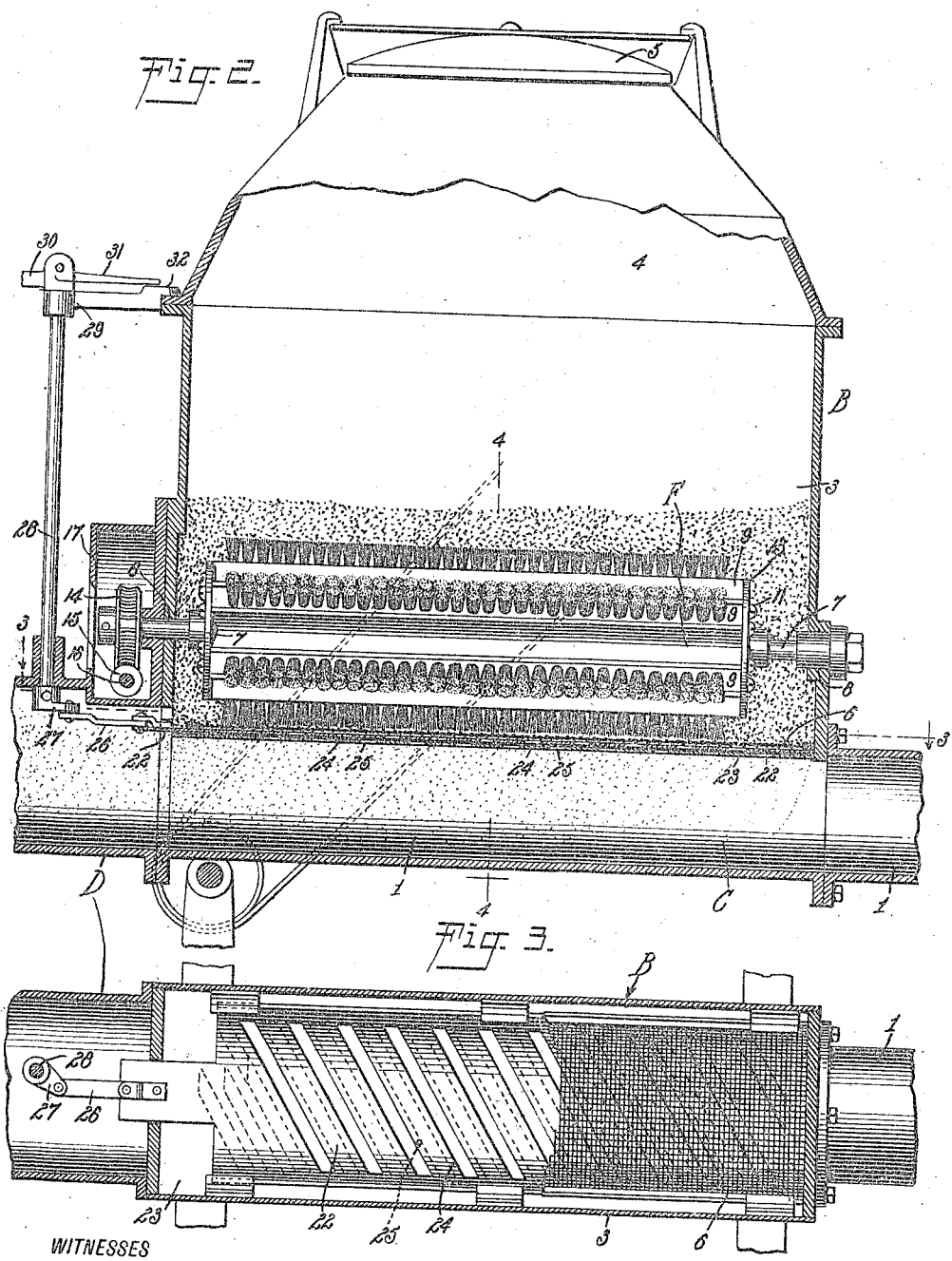

UNITED STATES PATENT OFFICE.

JACOB H. WRIGHT, OF MIDDLEPORT, NEW YORK, ASSIGNOR TO NIAGARA SPRAYER COMPANY, OF MIDDLEPORT, NEW YORK.

DUSTING-MACHINE FOR FRUIT-TREES, &c.

1,188,127.　　　Specification of Letters Patent.　　Patented June 20, 1916.

Application filed March 22, 1916. Serial No. 85,822.

*To all whom it may concern:*

Be it known that I, JACOB H. WRIGHT, a citizen of the United States, and a resident of Middleport, in the county of Niagara and State of New York, have invented a new and Improved Dusting-Machine for Fruit-Trees, &c., of which the following is a full, clear, and exact description.

This invention relates to a machine for dusting trees, vegetables and other crops with dry germicide or fungicide.

The invention has for its general objects to improve the construction and operation of apparatus of this character so as to be reliable and efficient in use, comparatively simple and inexpensive to manufacture, and easily regulated for the purpose of insuring the discharge of the proper amount of dust material, whereby trees, vegetables and other crops may be uniformly dusted as the machine travels along the rows, thus enabling much larger acreage to be dusted by a single machine and a single operator in the course of a day than has been possible with other machines heretofore in use.

A more specific object of the invention is the provision of a novel means for insuring the feeding of the dust of uniform fineness from the hopper to the eduction pipe, there being used in combination therewith a valve or shutter readily adjustable by the operator to regulate the amount of dust passing to the eduction pipe per unit of time.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the apparatus; Fig. 2 is an enlarged longitudinal section of the hopper and associated parts; Fig. 3 is a horizontal section on the line 3—3, Fig. 2; Fig. 4 is a vertical section on the line 4—4, Fig. 2; Fig. 5 is an end view of the rotary brush; Fig. 6 is a fragmentary sectional view of the brush; and Fig. 7 is a plan view of the valve or shutter adjusting device.

In the present instance the apparatus comprises, in the form of a unit, a blower A, a hopper or body B, a dust chamber C, an eduction pipe D, and a driving motor (not shown), the apparatus being mounted on a suitable frame E and is adapted to be carried by wheels, so that the machine can be driven along the rows of trees, vegetables or other crops to be dusted. The blower may be of any desired construction and has an outlet 1 which is connected with one end of the dust chamber C which is located under the hopper B. This hopper B is in the form of a box and has sloping sides 2 merging into the side walls 3 of the dust chamber C. The hopper has a top section 4 provided with a cover 5 which can be locked closed in dust-tight position. At the bottom of the hopper 2 is a horizontal arcuate or trough-like screen 6 of very fine mesh through which the dust material is forced by a suitable device for powdering lumps, such device being in the form of a rotary brush F located within the bottom of the hopper and mounted to rotate on a horizontal axis. The brush at its ends has journals 7 which rotate in bearings 8 in the end walls of the hopper. This brush is made up of a plurality of longitudinally extending bristle-carrying strips 9 radially adjustable in slots 10 of the brush body, and these bristle-carrying strips 9 are clamped in any desired position by means of screws or equivalent fastenings 11 which pass through slots 12 in the end disks 13 of the brush body and screw into the ends of the strips 9. By this means the diameter of the brush can be maintained at the proper dimension and thus compensate for the wearing away of the bristles. The periphery of the brush is concentric with the screen, so that the material is caused to be forced through the screen by the bristles traveling across the same, and consequently lumps of the dust material are broken up and the proper fineness of the material secured. The material as it passes through the screen is picked up by the draft of air produced by the fan and is carried out through the end of the chamber C opposite from the fan end and is forced through the eduction pipe D to and through the sprayer (not shown) on the upper end of the pipe. The journal at one end of the brush is provided with a worm or equivalent gear wheel 14 which meshes with a worm or the equivalent 15 on a horizontal shaft 16 journaled in a gear box 17 carried by the hopper B. This shaft 16 is connected by a sprocket and chain transmission 18 with a secondary shaft 19 journaled on one of the supporting brackets 20 for the hopper, and the shaft 19 is connected by a belt and pulley transmission 21 with a fan shaft, which latter is driven by a motor (not shown) or any suitable means.

To regulate the amount of material that passes from the hopper to the dust chamber a valve or shutter is employed. This valve or shutter 22 is a trough-shaped plate lying immediately under and in contact with the screen 6, so that the valve or shutter forms a support therefor, and under the valve is a stationary grate 23 conforming to the shape of the valve and on which the latter slides. The valve and grate have parallel slots 24 and 25 respectively which are obliquely disposed to the longitudinal axis of the valve and grate, which arrangement conduces to the best regulation of the feed. By sliding the valve back or forth the effective areas of the outlet openings for the dust material can be regulated, and thereby the control of the amount of material is rendered possible. One end of the valve is connected by a link 26 with a crank 27, which latter is fastened to the lower end of a vertical shaft 28 journaled at its lower end in the eduction pipe D and having its upper end steadied and supported by a bracket bearing 29 fastened to the upper part of the hopper. On this shaft 28 is an operating handle 30, and also an indicating hand 31 which moves over a dial or scale 32 carried by the bracket 29, so that the operator can accurately regulate the opening for the dust material to pass out of the hopper into the dust chamber.

From the foregoing it will be obvious that by the use of the construction illustrated it is possible to obtain a positive forced feed and complete pulverization of the lumps and cakes of the dust material, and furthermore, it is possible to maintain a uniform flow of material to the dust chamber, and the quantity of material fed to the dust chamber can be controlled to a nicety. The regulator for determining the amount of material to be fed is so devised and located as to offer the greatest possible convenience to the operator.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. In an apparatus of the class described, the combination of a hopper, a dust chamber under and communicating with the same, a fan connected with one end of the dust chamber for forcing air therethrough, an eduction pipe connected with the opposite end of the chamber, a trough-like screen supported between the bottom of the hopper and top of the chamber, a valve slidable under the screen, a grate supporting the valve and coöperating therewith for controlling the amount of material passing through the screen, and means operating in the hopper for forcing material through the screen and breaking up the lumps and cakes of material.

2. In an apparatus of the class described, the combination of a hopper, a dust chamber under and communicating with the same, a fan connected with one end of the dust chamber for forcing air therethrough, an eduction pipe connected with the opposite end of the chamber, a trough-like screen supported between the bottom of the hopper and top of the chamber, a valve slidable under the screen, a grate supporting the valve and coöperating therewith for controlling the amount of material passing through the screen, and a rotary brush mounted in the hopper and operating in contact with the screen for forcing the material through the latter, said brush including bristle-carrying strips adjustable to maintain the brushes in contacting relation with the screen.

3. In an apparatus of the class described, the combination of a hopper, a screen in the bottom of the hopper, a brush movable in contact with the screen for forcing material therethrough, a valve under the screen and in the form of a plate having obliquely disposed slots, a grate supporting the valve and being in the form of a plate having obliquely disposed slots parallel with the slots of the valve, means connected with the valve for moving the same to throw the slots thereof into and out of register with the slots of the grate, and means for forcing a current of air along the bottom of the grate for picking up the material passing through the screen and valve and grate and conducting the picked-up material away.

In testimony whereof I have signed my name to this specification in the presence of two subscribing witnesses.

JACOB H. WRIGHT.

Witnesses:
HARRY A. SHAW,
JOHN J. HAMMOND.